United States Patent [19]
Berrigan, Jr. et al.

[11] Patent Number: 4,749,492
[45] Date of Patent: Jun. 7, 1988

[54] PROCESS FOR RECOVERING REGENERATED ADSORBENT PARTICLES AND SEPARATING ASH THEREFROM

[75] Inventors: John K. Berrigan, Jr., Wausau; David A. Beula, Schofield; William M. Copa, Wausau, all of Wis.

[73] Assignee: Zimpro/Passavant, Rothschild, Wis.

[21] Appl. No.: 69,981

[22] Filed: Jul. 6, 1987

[51] Int. Cl.$^4$ ............................ B03D 3/06; C02F 3/08; C02F 1/28
[52] U.S. Cl. .................................. 210/616; 209/5; 210/673; 210/675; 210/694; 210/713; 210/727; 210/804; 210/805
[58] Field of Search .................... 209/5; 210/616, 675, 210/694, 696–698, 710, 712, 713, 727, 738, 732–736, 768–772, 803–806, 673; 502/23

[56] References Cited
U.S. PATENT DOCUMENTS

| | | | |
|---|---|---|---|
| 3,876,536 | 4/1975 | Pradt et al. | 210/10 |
| 3,904,518 | 9/1975 | Hutton et al. | 210/616 |
| 4,069,148 | 1/1978 | Hutton et al. | 210/616 |
| 4,541,933 | 9/1985 | Armold et al. | 210/780 |
| 4,555,329 | 11/1985 | Sykes et al. | 209/5 |

FOREIGN PATENT DOCUMENTS 1073365 3/1980 Canada .
56-96713 8/1981 Japan .

*Primary Examiner*—Ivars Cintins
*Attorney, Agent, or Firm*—Michael, Best & Friedrich

[57] ABSTRACT

Regenerated adsorbent particles, such as activated carbon, are recovered from a wet oxidation-regenerated mixed liquor sludge from a wastewater treatment system by diluting and settling a blowdown slurry from the wet oxidation reactor to obtain a first aqueous phase containing primarily regenerated adsorbent particles and fine ash particles and a first solids phase containing primarily grit particles. The first aqueous phase is combined with a portion of the regenerated adsorbent particle slurry withdrawn from the upper portion of the wet oxidation reactor and, after treatment with a dispersing agent and then an anionic flocculating agent, the resulting mixture is settled to obtain a second aqueous phase containing primarily fine ash particles and a second solids phase containing primarily regenerated adsorbent particles. The second solids phase is recycled to the treatment system for reuse and, after treatment with a cationic flocculating agent, the second aqueous phase is settled to obtain a substantially particle-free third aqueous phase and a third solids phase containing primarily fine ash particles. Slurries containing the grit and fine ash particles are combined and dewatered prior to disposal.

20 Claims, 1 Drawing Sheet

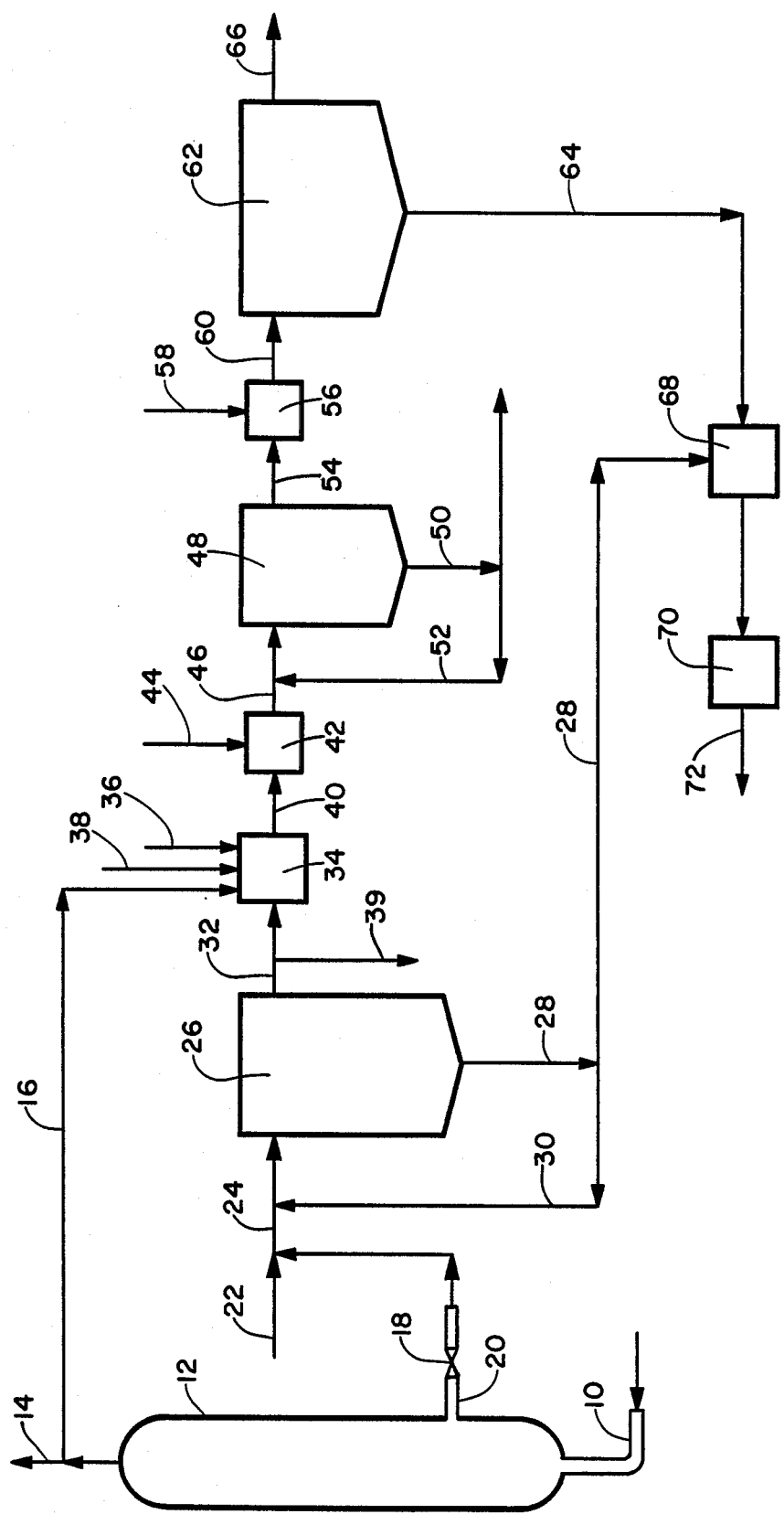

PROCESS FOR RECOVERING REGENERATED ADSORBENT PARTICLES AND SEPARATING ASH THEREFROM

BACKGROUND OF THE INVENTION

I. Field of the Invention

This invention relates to processes for recovering regenerated adsorbent particles, such as activated carbon, from a mixture of adsorbent and ash particles.

II. Description of Related Art

Powdered adsorbent materials, such as activated carbon, coke fines, diatomaceous earth, fly ash and the like, are used in wastewater treatment in a variety of ways. For instance, such materials are added to biological treatment systems to enhance performance. Powdered activated carbon is most commonly used for this purpose and in some processes is mixed with biological solids in an aeration basin. Examples of such processes are described in U.S. Pat. Nos. 3,904,518 and 4,069,148.

Once the adsorptive properties of the activated carbon are expended, it must be regenerated before it can be reused in the treatment process.

One method for regenerating carbon involves wet oxidation of the mixture of biological solids and spent carbon. Wet oxidation at elevated temperatures and pressures destroys the volatile portion of the biological solids and oxidizes the organic substances adsorbed on the surface of the powdered carbon to restore its adsorptive capacity. The resulting regenerated carbon is recycled as part of an aqueous slurry to the treatment process.

The recovered aqueous slurry from the wet oxidation regeneration process consists primarily of reactivated carbon particles and inorganic ash particles removed from the wastewater by the carbon and formed during the regeneration process. The continued recycle of this ash along with the recovered carbon to the treatment process eventually leads to a undesirable accumulation of ash in the wastewater treatment system. Thus, there is a need to remove a portion of the ash from the regenerated carbon stream to prevent a detrimental buildup of ash in the wastewater treatment system.

The ash particles mixed with carbon particles are not homogeneous. These inert particles appear to be composed of coarse sand-sized particles, called grit, which settle readily, and extremely fine ash particles which suspend in water and settle only with great difficulty. The inert grit material is found to accumulate in the wet oxidation reactor during regeneration of the spent carbon/biomass mixture slurry. The grit material must be intermittently removed from the reactor to prevent plugging of the wet oxidation system.

Canadian Burant et al. Pat. No. 1,073,365 discloses removing inert ash from a powdered activated carbon by classification of inert solids in a wet air oxidation reactor during carbon regeneration. The heavier inert solids are removed from the bottom of the reactor with a so-called "blowdown" stream while a regenerated carbon slurry is removed from the top of the reactor and returned to the treatment system. Classification of grit and ash from carbon in the wet air oxidation reactor is not complete and some carbon is contained in the blowdown stream. This patent discloses that the solids in the blowdown stream may contain up to 20 weight percent carbon.

Recovery of this carbon is highly desirable from an economic standpoint. The problem is to recover the carbon from the blowdown stream while preventing the return of the fine ash particles to the wastewater treatment system.

Representative prior patents relating to separating ash from regenerated carbon include Pradt et al. U.S. Pat. No. 3,876,536 which discloses separating ash from a regenerated carbon with a separation device which makes use of the difference in the specific gravity between the ash and the regenerated carbon.

Arnold et al. U.S. Pat. No. 4,541,933 discloses separating ash from a wet oxidized activated sludge/powdered carbon mixture by using a plurality of hydrocyclones to concentrate the ash and then collecting the ash concentrate on a screen.

Japanese Patent Application No. 96713/81 discloses diluting a regenerated carbon/ash mixture with from two to ten volumes of water, and adding a dispersing agent, if the total hardness is higher than 100, to suspend the ash particles and precipitate the carbon particles. The precipitated carbon is recycled to the treatment process. A cationic flocculent is added to the water suspension containing ash particles to precipitate the ash.

Sykes et al. U.S. Pat. No. 4,555,329 discloses separating inorganic gangues from coal particles in a coal refuse slurry by adding low molecular weight, anionic vinyl polymers to disperse the slurry and then adding high molecular weight, anionic vinyl polymers to flocculate and settle the coal particles.

Hoffman, et al. U.S. application Ser. No. 9,498, filed Feb. 2, 1987 and assigned to the assignee of the present application, discloses separating wet air regenerated slurry supernatant from carbon and ash particles before separating carbon particles from inert ash particles.

SUMMARY OF THE INVENTION

An object of the invention is to provide a process for improving the recovery of adsorbent particles, such as activated carbon from a slurry which has been regenerated in a wet oxidation reactor.

Another object of the invention is to provide an effective, economical process for separating fine ash particles from regenerated adsorbent particles.

A further object of the invention is to reduce the volume of solids for disposal separated from adsorbent particles recovered from a wastewater treatment system and regenerated by wet oxidation.

The process provided by the invention is effective for recovering regenerated adsorbent particles, such as regenerated carbon, from an aqueous slurry which originally contained spent adsorbent particles, ash and ash-producing particles and the spent adsorbent particles have been regenerated in a wet oxidation reactor. A blowdown stream including an aqueous slurry containing grit and regenerated adsorbent particles is removed from the lower portion of the wet oxidation reactor, diluted with water and then settled to produce a first aqueous phase containing primarily suspended regenerated adsorbent particles and a first solids phase containing grit particles. The first aqueous phase is combined with a regenerated adsorbent slurry removed from the upper portion of the wet oxidation reactor, treated with a dispersing agent to cause suspension of fine ash particles and then admixed with an anionic flocculating agent to cause settling of the regenerated adsorbent particles. The thus-treated mixture is then settled to produce a second aqueous phase containing primarily fine ash particles and a second solids phase containing primarily regenerated adsorbent particles. These phases are separated and a regenerated adsorbent slurry including the second solids phase can be recycled to a wastewater treatment system for reuse.

In one embodiment, the second aqueous phase is treated with a cationic flocculating agent to cause settling of fine ash particles, the thus-treated second aqueous phase is settled to produce a substantially particle-free third aqueous phase and a third solids phase containing primarily fine ash particles. These two phases are separated and the substantially particle-free aqueous phase can be recycled to a wastewater treatment system for reuse or discharged to waste.

In another embodiment, the first and third solid phases are combined and then dewatered with a filter means.

BRIEF DESCRIPTION OF DRAWING

The drawing is a flow diagram illustrating a preferred embodiment of the invention.

DESCRIPTION OF THE PREFERRED EMBODIMENTS

While the process can be used for other applications and other adsorbent particles, it is particularly adaptable for recovery of regenerated carbon from a wet oxidation regenerated mixed liquor sludge (a mixture of biological solids and spent activated carbon) from a wastewater treatment system and will be described in connection with such application.

Referring to the drawing, a stream of mixed liquor sludge and a pressurized oxygen-containing gas, such as air, is introduced through a conduit 10 into a wet oxidation reactor 12. The reactor 12 is operated in a conventional manner (e.g., at a temperature of about 475° F. and a pressure of about 900 psig) to destroy the biological solids and regenerate the spent carbon in the incoming stream and to classify the solid particles such as described in Canadian Burant et al. Pat. No. 1,073,365 which is incorporated herein by reference.

An aqueous slurry containing primarily regenerated carbon particles and a lesser amount of fine ash particles (e.g., 0.001–0.003 mm) is removed from the upper portion of the reactor 12 through a conduit 14 and recycled to the wastewater treatment system for reuse. In order to prevent an undesirable accumulation of fine ash particles in the treatment system, a portion of the regenerated carbon slurry is withdrawn through a conduit 16 and treated to remove ash particles as described below.

A valve 18 in a blowdown conduit 20 connected to the lower portion of the reactor 12 is opened periodically to remove grit and ash particles from the reactor. For example, the valve 18 may be opened about 15 seconds every hour or about 20 seconds every two hours. The blowdown slurry flowing through the conduit 20 contains primarily relatively coarse grit particles (e.g., 0.03 mm and larger), some fine ash particles and also regenerated carbon particles in amounts ranging from as low as about 15% to as high as about 55% of the suspended solids in the slurry. The weight ratio of the solids in the regenerated carbon slurry flowing through the conduit 16 to the solids in the blowdown slurry removed from the reactor 12 through the blowdown conduit 20 usually is in the order of about 10 to 1.

The blowdown slurry is diluted with water introduced through conduit 22 for cooling and to reduce the concentration of soluble organics and calcium ions and thereby improve a subsequent carbon/ash separation. The water used for dilution should be substantially clean and have a hardness (combined calcium and magnesium content) of less than about 50 ppm. As used herein, the term "substantially clean" means that the water does not include contaminants which tend either to cause the fine ash particles to flocculate or precipitate. The dilution water does not have to be potable or deionized. It can be soft water, tap water or an effluent from the wastewater treatment system. The volumetric ratio of the dilution water to the blowdown slurry should be within a range of about 0.1 to about 10.

The dilute blowdown slurry is introduced via a conduit 24 into a first gravity separating means, preferably an inclined plate settler 26. In the settler 26, a first solids phase containing primarily grit particles settles to the bottom, leaving a first aqueous phase containing primarily suspended regenerated carbon and fine ash particles. As used herein the term "solids phase" means a thickened, aqueous slurry produced during gravity separation or settling and containing a higher concentration of solid particles than in the slurry prior to settling. A grit slurry including the first solids phase is withdrawn from the bottom of the settler 26 via a conduit 28 for further treatment as described below. In the event flow in the system downstream of the conduit 28 is interrupted, the grit slurry can be recycled to the settler 26 via a conduit 30 to prevent plugging of pipes by settling grit particles.

A carbon/ash slurry including the first aqueous phase overflows from the settler 26 via a conduit 32 and is introduced into a mixing tank 34 where it is combined with the regenerated carbon slurry flowing through the conduit 16. A dispersing agent for suspending the ash particles is introduced into the mix tank via a conduit 36 and admixed with the combined carbon/ash and regenerated carbon slurries.

Suitable dispersing agents include sodium hexametaphosphate, sodium tripolyphosphate, sodium pyrophosphate, sodium silicate, sodium hydroxide, EDTA, borax and mixtures thereof. The amount of dispersing agent added is sufficient to cause the ash particles to remain in suspension. Generally, this amount is about 5 to about 500, preferably about 10 to about 100, and most preferably about 10 to about 30 mg/l, based on the total volume of the regenerated carbon slurry and the carbon/ash slurry in the mix tank 34.

When required to obtain optimum subsequent carbon/ash separation, additional substantially clean dilution water can be added to the mix tank 34 via a conduit 38.

When the carbon content in the blowdown slurry is relatively high and the ash content is relatively low, which usually is the case when fresh activated carbon is being used, all or a portion of the overflow from the settler 26 can be recycled to the wastewater treatment system via a conduit 39.

The dispersant-treated mixture in the mix tank 34 flows therefrom via a conduit 40 into a first flocculation tank 42. An anionic flocculating agent for promoting settling of the carbon particles is introduced into the flocculating tank 42 via a conduit 44 and admixed with the dispersant-treated mixture therein.

The flocculating agent preferably is an anionic polymer type. A particularly effective commercially available anionic polymer is Percol 726, marketed by Allied Colloids, Suffolk, Va., which is a high molecular weight copolymer of sodium acrylate and acrylamide. Other suitable commercially available anionic polymers include Magnifloc 835A, marketed by American Cyanamid, Wayne, N.J., Hydrofloc 420, marketed by Aqua Ben Corp., Orange, Calif., WT-7736, marketed by Calgon Corp., Pittsburgh, Pa. and Hercofloc 1031, marketed by Hercules Corp., Wilmington, Del.

The amount of anionic flocculating agent added is sufficient to cause the carbon particles to settle without substantially increasing the settling of ash particles. Generally, this amount is about 0.1 to about 4, preferably about 0.2 to about 1 mg/l, based on the total volume of the dispersant-treated mixture. Amounts of anionic flocculating agent greater than about 4 mg/l tend to cause both the ash and carbon particles to settle.

The resulting mixture treated with a dispersing agent and an anionic flocculating agent flows from the flocculating tank 44 via a conduit 46 and is introduced into a second gravity settling means, preferably an elutriation tank 48 suitable for separating a suspension of finely divided solids into parts according to their weight. In the elutriation tank 48, a second solids phase containing primarily regenerated carbon particles settles to the bottom, leaving a second aqueous phase containing primarily fine ash particles. A carbon slurry including the second solids phase is withdrawn from the bottom of the elutriation tank 48 via a conduit 50 and recycled to the wastewater treatment system for reuse. In the event flow in the system downstream of the conduit 50 is interrupted, the carbon slurry can be recycled to the elutriation tank 48 via a conduit 52 to prevent plugging of the pipe by settling carbon particles.

An ash slurry including the second aqueous phase is withdrawn from the elutriation tank 48 via a conduit 54 and is introduced into a second flocculating tank 56. A cationic flocculating agent for promoting settling of ash particles is introduced into the flocculating tank 56 via a conduit 58 and admixed with the ash slurry therein.

The cationic flocculating agent preferably is a cationic polymer type. Particularly effective commercially available cationic polymers include Percol 720, marketed by Allied Colloids, Suffolk, Va., which is a low charge, high molecular weight polyacrylamide, and Perchem 4P45, marketed by Chemlink, Newtown Square, Pa., which is a high charge, low molecular weight polyquaternary amine.

The amount of cationic flocculating agent added is sufficient to cause the fine ash particles to settle. Generally, this amount is about 0.5 to about 10, preferably about 2 mg/l, based on a total volume of the ash slurry.

The flocculant-treated ash slurry flows from the flocculating tank 56 via a conduit 60 and is introduced into a third gravity separating means, preferably a settler-clarifier 62. In the settler-clarifier 62, a third solids phase containing primarily fine ash particles settles to the bottom, leaving a third substantially particle-free aqueous phase. The third aqueous phase is withdrawn from the settler-clarifier 62 via a conduit 66 and either recycled to the wastewater treatment system for reuse or discharged for disposal.

An ash slurry including the third solids phase is withdrawn from the settler-clarifier 62 via conduit 64 and is introduced into a tank 68 or the like where it is combined with the grit slurry flowing through the conduit 28 from the settler 26. The combined slurries are introduced into a filter-type dewatering means, preferably a filter press 70, for removal of water prior to disposal. The removed water is withdrawn from the filter press via a conduit 72 and discharged to waste or recycled to the wastewater treatment system. It has been found that the presence of the coarser grit solids, which usually make up about 5-25% of the solids in the combined slurries, facilitates removal of water in the filter press, resulting in a significant reduction in the volume of solids for disposal. The remaining solids usually are disposed of in a landfill or the like.

From the above description, it can be seen that the invention provides a simple, effective process for maximizing the recovery of adsorbent particles regenerated by wet oxidation. Adsorbent particles normally lost in the blowdown stream from the lower portion of the wet oxidation reactor is recovered. The larger grit-like particles separated from the adsorbent particles in that stream is combined with fine ash particles separated from the regenerated carbon slurry removed from the upper portion of the wet oxidation reactor to provide a combined solids phase which has improved dewatering properties.

From the foregoing description, one skilled in the art can easily ascertain the essential characteristics of the invention and, without departing from the spirit and scope thereof, make various changes and modifications to adapt it to various usages.

We claim:

1. A process for recovering regenerated absorbent particles from an aqueous slurry containing spent absorbent particles, ash particles and ash-producing materials comprising the steps of:
   (a) treating said spent absorbent slurry in a vertical wet oxidation reactor in the presence of a pressurized oxygen-containing gas to regenerate said spent absorbent, produce fine ash and grit particles, and classify the resulting solids;
   (b) removing an aqueous absorbent slurry containing primarily regenerated adsorbent particles and fine ash particles from the upper portion of said reactor;
   (c) removing an aqueous slurry containing primarily grit and regenerated adsorbent particles from the lower portion of said reactor;
   (d) adding substantially clean water to said grit/adsorbent slurry at a volumetric ratio of about 0.1 to about 10;
   (e) settling said dilute grit/adsorbent slurry to produce a first aqueous phase containing primarily suspended adsorbent particles and a first solids phase containing primarily grit particles;
   (f) separating said first aqueous phase from said first solids phase;
   (g) combining said first aqueous phase and at least a portion of said regenerated adsorbent slurry and admixing therewith a sufficient amount of a dispersing agent to cause suspension of said fine ash particles;
   (h) admixing with the resulting mixture a sufficient amount of an anionic flocculating agent to cause settling of said regenerated adsorbent particles;
   (i) settling said resulting thus-treated mixture to produce a second aqueous phase containing primarily fine ash particles and a second solids phase containing primarily regenerated adsorbent particles; and
   (j) separating said second aqueous phase from said second solids phase.

2. A process according to claim 1 including the further steps of:
   (k) admixing with said second aqueous phase a sufficient amount of a cationic flocculating agent to cause settling of said fine ash particles;

(l) settling said thus-treated second aqueous phase to produce a substantially particle-free third aqueous phase and a third solids phase containing primarily fine ash particles; and (m) separating said third aqueous phase from said third solids phase.

3. A process according to claim 2 including the further steps of:

(n) combining said first and third solids phase; and (o) dewatering said combined first and third solids phase with a filter means.

4. A process according to claim 2 wherein said flocculating agent added to step (k) is a cationic polymer and the amount added is about 0.5 to about 10 mg/l, based on the total volume of said second aqueous phase.

5. A process according to claim 1 wherein said spent adsorbent slurry is recovered from a wastewater treatment system and said second solids phase is recycled to said treatment system.

6. A process according to claim 1 wherein said spent adsorbent slurry is recovered from a wastewater treatment system and said first aqueous phase is periodically recycled to said treatment system.

7. A process according to claim 1 wherein the amount of said dispersing agent added in step (g) is about 5 to about 500 mg/l, based on the total volume of said combined first aqueous phase and regenerated adsorbent slurry.

8. A process according to claim 7 wherein the amount of said dispersing agent is about 10 to about 100 mg/l.

9. A process according to claim 1 wherein said flocculating agent added in step (h) is an anionic polymer and the amount added is about 0.1 to about 4 mg/l, based on the total volume of said resulting mixture.

10. A process according to claim 9 wherein the amount of said anionic polymer is about 0.2 to about 1 mg/l.

11. A process according to claim 1 wherein said regenerated adsorbent particles are activated carbon.

12. A process for recovering regenerated carbon particles from a mixture of biological solids and spent activated carbon recovered from a wastewaster treatment system comprising the steps of:

(a) treating said mixture in a vertical wet oxidation reactor in the presence of a pressurized oxygen-containing gas to regenerate said spent carbon, produce fine ash and grit particles and classify the resulting solids;

(b) removing an aqueous carbon slurry containing primarily regenerated carbon and fine ash particles from the upper portion of said reactor;

(c) removing an aqueous slurry containing primarily grit and regenerated carbon particles from the lower portion of said reactor;

(d) adding substantially clean water to said grit/carbon slurry at a volumetric ratio of about 0.1 to about 10;

(e) settling said dilute grit/carbon slurry to produce a first aqueous phase containing primarily suspended regenerated carbon particles and a first solids phase containing primarily grit particles;

(f) separating said first aqueous phase from said first solids phase;

(g) combining said first aqueous phase and at least a portion of said regenerated carbon slurry and admixing therewith a sufficient amount of a dispersing agent to cause suspension of said fine ash particles;

(h) admixing with said resulting mixture a sufficient amount of an anionic polymer to cause settling of said regenerated carbon particles;

(i) settling said thus-treated resulting mixture in an elutriation means to produce a second aqueous phase containing primarily fine ash particles and a second solids phase containing primarily regenerated carbon particles;

(j) separating said second aqueous phase from said second solids phase;

(k) recycling said second solids phase to said treatment system;

(l) admixing with said second aqueous phase a sufficient amount of a cationic polymer to cause settling of said fine ash particles;

(m) settling said thus-treated second aqueous phase to produce a substantially particle-free third aqueous phase and a third solids phase containing primarily fine ash particles; and (n) separating said third aqueous phase from said third solids phase.

13. A process according to claim 12 wherein the amount of said dispersing agent added in step (g) is about 5 to about 500 mg/l, based on the total volume of said combined first aqueous phase and regenerated carbon slurry.

14. A process according to claim 13 wherein the amount of said dispersing agent is about 10 to about 100 mg/l.

15. A process according to claim 12 wherein the amount of said anionic polymer added in step (h) is about 0.1 to about 4 mg/l, based on the total volume of said resulting mixture.

16. A process according to claim 15 wherein the amount of said anionic polymer is about 0.2 to about 1 mg/l.

17. A process according to claim 12 wherein the amount of said cationic polymer added to step (l) is about 0.5 to about 10 mg/l, based on the total volume of said second aqueous phase.

18. A process according to claim 12 wherein said third aqueous phase is recycled to said treatment system.

19. A process according to claim 12 including the further steps of:

(o) combining said first and third solids phases (p) dewatering said combined first and third solids phase with a filter press means; and (q) discharging said dewatered solids to waste.

20. A process according to claim 12 wherein said third aqueous phase is discharged to waste.

* * * * *

UNITED STATES PATENT AND TRADEMARK OFFICE
CERTIFICATE OF CORRECTION

PATENT NO. : 4,749,492

DATED : June 7, 1988

INVENTOR(S) : John K. Berrigan, Jr., David A. Beula, and William M. Copa

It is certified that error appears in the above-identified patent and that said Letters Patent is hereby corrected as shown below:

Column 6, line 25, "absorbent" should be --adsorbent--;

line 26/27, "absorbent" should be --adsorbent--;

line 29, "absorbent" should be --adsorbent--;

line 32, "absorbent" should be --adsorbent--;

line 34, "absorbent" should be --adsorbent--.

Signed and Sealed this

Twenty-second Day of November, 1988

*Attest:*

DONALD J. QUIGG

*Attesting Officer*   *Commissioner of Patents and Trademarks*